United States Patent
Yoshizumi et al.

(10) Patent No.: US 6,201,718 B1
(45) Date of Patent: *Mar. 13, 2001

(54) STEP-UP POWER SUPPLY CIRCUIT AND INTEGRATED CIRCUIT DEVICE

(75) Inventors: Norio Yoshizumi; Haruyuki Inohana; Akio Ozawa, all of Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/450,739

(22) Filed: Nov. 30, 1999

(30) Foreign Application Priority Data

Dec. 22, 1998 (JP) ................................................. 10-364732

(51) Int. Cl.[7] ............................. H02M 3/18; H02M 7/00; H02M 7/19
(52) U.S. Cl. ................................. 363/60; 363/59; 307/110
(58) Field of Search .......................... 363/59, 60; 307/110

(56) References Cited

U.S. PATENT DOCUMENTS

| | | | |
|---|---|---|---|
| 5,111,375 | * | 5/1992 | Marshall ................................. 363/60 |
| 5,625,544 | * | 4/1997 | Kowshik et al. ....................... 363/59 |
| 5,907,484 | * | 5/1999 | Kowshik et al. ....................... 363/60 |
| 5,939,866 | * | 8/1999 | Bjorkengen ............................. 363/60 |
| 5,973,546 | * | 10/1999 | Le et al. ................................. 363/60 |
| 6,008,690 | * | 12/1999 | Takeshima et al. .................... 363/60 |

* cited by examiner

*Primary Examiner*—Peter S. Wong
*Assistant Examiner*—Bao Q. Vu
(74) *Attorney, Agent, or Firm*—Sughrue, Mion, Zinn, Macpeak & Seas, PLLC

(57) ABSTRACT

A step-up power supply circuit is provided with a rectifying diode D1 to which a predetermined voltage Vcc is applied from a power supply 16, a capacitor $C_{D1}$ connected in series with the rectifying diode D1, a rectifying diode D2 connected to a joint point between the rectifying diode D1 and the capacitor $C_{D1}$, a capacitor $C_{D2}$ connected in series with the rectifying diode D2. A trapezoidal wave signal $S_D$ produced by a triangular wave generating circuit 7, an amplifier 8, and a drive unit 9 is applied to the capacitor $C_{D1}$ so as to turn ON/OFF the rectifying diodes D1 and D2. As a result, a voltage substantially equal to a voltage Vcc is produced across the capacitor $C_{D1}$, and a step-up voltage HVcc approximately two times higher than the voltage Vcc is produced across the capacitor $C_{D2}$. Since the rectifying diodes D1 and D2 are turned ON/OFF in response to the trapezoidal signal $S_D$ having the small RF component, the occurrence of the switching noise from the rectifying diodes D1 and D2 can be suppressed.

12 Claims, 5 Drawing Sheets

STEP-UP POWER SUPPLY CIRCUIT AND INTEGRATED CIRCUIT DEVICE

BACKGROUND OF THE INVENTION

1. Field of the Invention

The present invention is related to a step-up power supply circuit for producing a higher step-up voltage than a preselected power supply voltage, and also to an integrated circuit device equipped with the step-up power supply circuit.

2. Description of the Related Art

Conventionally, in an electronic appliance with employment of a dry cell and an on-vehicle battery, having relatively low output voltages, a step-up power supply circuit is provided. The step-up power supply circuit produces a step-up voltage in response to the output voltage of the above-described power supply. This step-up voltage is used as an operating power supply voltage in this electronic appliance.

FIG. 8 represents an example of an electronic appliance arranged by employing the above-described conventional step-up power supply circuit 1 and a semiconductor integrated circuit device 2 having a plurality of amplifiers $AM_0$ to $AM_3$. In this drawing, the step-up power supply circuit 1 is equipped with a rectangular wave generating circuit 4 and a step-up circuit 5, which are operated under a power supply voltage Vcc outputted from a power supply 3 such as a dry cell and an on-vehicle battery.

The rectangular wave generating circuit 4 is constituted by an astable multivibrator and the like, which outputs such a rectangular wave Sc. The amplitude of this rectangular wave is rapidly inverted in a predetermined time period. The step-up circuit 5 is arranged by a voltage doubler rectifying circuit equipped with a rectifying diode and a capacitor. The step-up circuit 5 ON/OFF-controls the rectifying diode in synchronism with the rectangular wave Sc to charge the capacitor, so that a step-up voltage HVcc higher than the power supply voltage Vcc is produced.

This step-up voltage HVcc is applied to the semiconductor integrated circuit device 2, and since the amplifiers $AM_0$ to $AM_3$ are operated while using the step-up voltage HVcc as the operating power supply voltage, these amplifiers $AM_0$ to $AM_3$ amplify signals entered into input terminals $IN_0$ to $IN_3$ to thereby output the amplified signals to the respective output terminals $Q_0$ to $Q_3$.

As previously explained, in the electronic appliance, the step-up power supply circuit 1 for producing the higher step-up voltage HVcc than the power supply voltage Vcc of the power supply 3, and the amplifiers $AM_0$ to $AM_3$ are operated under the operating power supply voltage HVcc, so that the dynamic range may be extended.

On the other hand, in the above-described conventional step-up power supply circuit 1, since the rectifying diode contained in the step-up circuit 5 is ON/OFF-controlled based upon the rectangular wave Sc containing the radio frequency (high frequency) components, the RF (radio frequency) switching noise is produced from the rectifying diode. There is a problem that this RF switching noise is entered into the amplifiers $AM_0$ to $AM_3$ provided in the semiconductor integrated circuit device 2 and then is mixed with the respective amplified signals derived from the output terminals $Q_0$ to $Q_3$.

As the conventional problem avoiding means, the step-up power supply circuit 1 and the semiconductor integrated circuit device 2 are separately mounted on the electric circuit board. Also, the ground GND1 of the step-up power supply circuit 1 and the ground GND2 of the semiconductor integrated circuit device 2 are formed on the electric circuit board in such a manner that these grounds GND1 and GND2 are separated from each other. Furthermore, the capacitors, resistors, coils and the like capable of absorbing the above-described RF switching noise are mounted on the electric circuit board.

However, there is another problem that since such a problem avoiding means is conducted, a total number of electronic components is increased and the entire electric circuit board becomes bulky. Also, both the step-up power supply circuit 1 and the semiconductor integrated circuit device 2 are separately arranged in order to prevent the adverse influence caused by the above-explained switching noise. As a result, while the total quantity of electronic components are increased, the high-performance electronic appliance can be hardly realized within a limited volume in high density.

SUMMARY OF THE INVENTION

The present invention has been made to solve the conventional problems, and therefore, has an object to provide a step-up power supply circuit capable of suppressing an occurrence of noise, and also to provide an integrated circuit device containing this step-up power supply circuit.

To achieve the above-described object, according to the present invention, there is provided a step-up power supply circuit comprising:

a first rectifying element to which a predetermined voltage is applied from a power supply;

a first capacitive element connected in series with the first rectifying element;

a second rectifying element connected to a joint point between the first rectifying element and the first capacitive element;

a second capacitive element connected in series with the second rectifying element; and drive means connected in series with the first capacitive element, for applying to the first capacitive element, a signal having a waveform whose amplitude is not rapidly changed, but becomes constant every predetermined time period;

wherein a step-up voltage higher than the predetermined voltage is produced from the second capacitive element by turning ON/OFF the first and second rectifying elements in response to a change in the amplitudes of the signal.

Also, a trapezoidal waveform signal is applied to the above-explained first capacitive element.

In accordance with this arrangement, when the signal derived from the drive means is applied to the first capacitive element, biases of the first and second rectifying elements are alternately inverted in response to a change in amplitudes of this signal, so that the ON/OFF switching operation is carried out. Since such an ON/OFF switching operation is carried out, a voltage substantially equal to the power supply voltage is produced across the first capacitive element, and another voltage approximately two times higher than the power supply voltage is produced across the second capacitive element. In this case, since the signal applied to the first capacitive element is such a signal having a waveform whose amplitude becomes constant every time a preselected time period has passed, but having no rapidly changed amplitudes, this signal corresponds to a signal not having a so-called "RF (radio frequency) component." In response to the amplitude change of this signal, when the first and second rectifying elements are turned ON/OFF, the RF switching noise is not produced from these first and second rectifying elements, but the step-up power supply circuit capable of suppressing the occurrence of the RF switching noise can be realized.

According to another aspect of the invention, there is provided an integrated circuit device equipped with a step-up power supply circuit, such an integrated circuit device equipped with a step-up power supply circuit, in which the step-up power supply circuit and a circuit operated by using a step-up voltage produced from the step-up power supply circuit as an operating power supply voltage are formed on the same semiconductor substrate, said step-up power supply circuit comprising:

- a first rectifying element to which a predetermined voltage is applied from a power supply and a first capacitive element is series-connected;
- a second rectifying element which is connected to a joint point between the first rectifying element and the first capacitive element, and to which a second capacitive element is series-connected;
- a second capacitive element connected in series with the second rectifying element; and
- drive means connected in series with the first capacitive element, for applying to the first capacitive element, a signal having a waveform whose amplitude is not rapidly changed, but becomes constant every predetermined time period;
- wherein a step-up voltage higher than the predetermined voltage is produced from the second capacitive element by turning ON/OFF the first and second rectifying elements in response to a change in the amplitudes of the signal.

In accordance with the above-described circuit arrangement, since the signal applied to the first capacitive element is such a signal having a waveform whose amplitude becomes constant every time a preselected time period has passed, but having no rapidly changed amplitudes, this signal corresponds to a signal having a so-called "RF (radio frequency) component." In response to the amplitude change of this signal, when the first and second rectifying elements are turned ON/OFF, the RF switching noise is not produced from these first and second rectifying elements, and the step-up power supply circuit capable of suppressing the occurrence of the RF switching noise can be realized. As a result, even when both the step-up power supply circuit and a circuit (another circuit) operable by using the step-up voltage produced from this step-up voltage circuit as an operating power supply voltage are formed on the same semiconductor substrate, the adverse influence caused by noise given to another circuit can be suppressed.

DETAILED DESCRIPTION OF THE PREFERRED EMBODIMENTS

Figure 1:
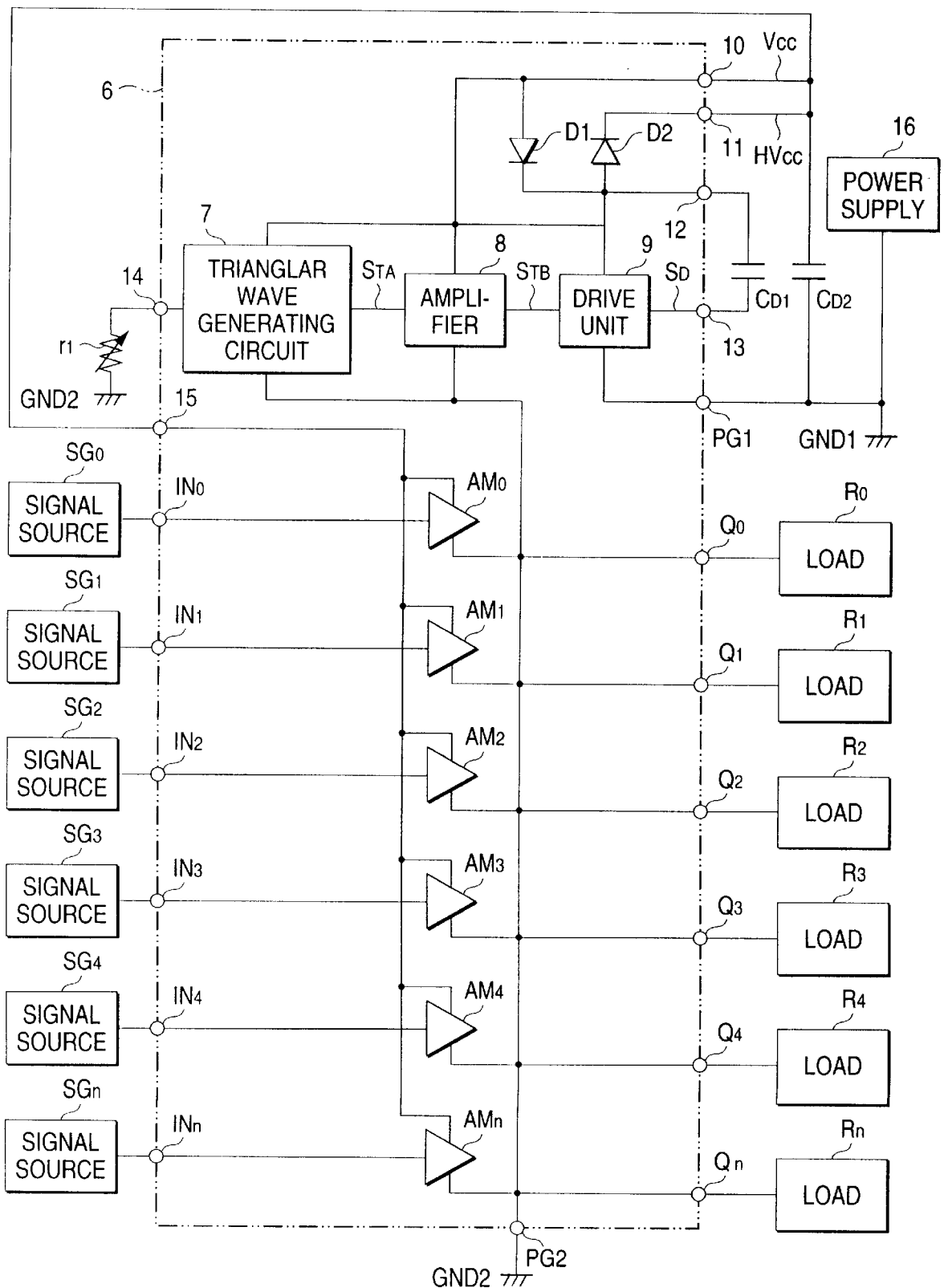
FIG. 1 is a block diagram for showing an arrangement of a step-up power supply circuit and an arrangement of an integrated circuit device according to an embodiment of the present invention.

Referring now to drawings, various embodiment modes of the present invention will be described. FIG. 1 is a schematic block diagram for an arrangement of a step-up power supply circuit according to this embodiment mode, and an arrangement of an audio signal amplifying semiconductor integrated circuit device equipped with this step-up power supply circuit.

In this drawing, this semiconductor integrated circuit device 6 owns a single in-line type package structure, or a dual in-line type package structure having a plurality of lead terminals, which is formed as an one chip on the same semiconductor substrate and then is molded in resin by a semiconductor manufacturing process.

The semiconductor integrated circuit device 6 is provided with a triangular wave generating circuit 7, an amplifier 8, a drive unit 9, and rectifying diodes D1/D2 functioning as rectifying elements, which constitute a step-up power supply circuit, and furthermore, "n" sets of amplifiers $AM_0$ to $AM_n$. These amplifiers $AM_0$ to $AM_n$ amplify plural channels of audio signals to output the amplified audio signals.

Also, this semiconductor integrated circuit device 6 is provided with a ground terminal $P_{G1}$ for setting the ground of the drive unit 9; another ground $P_{G2}$ for setting the grounds of the triangular wave generating circuit 7, the amplifier 8, and the amplifiers $AM_0$ to $AM_n$; input terminals $IN_0$ to $IN_n$ connected to the inputs of the amplifiers $AM_0$ to $AM_n$; and furthermore, output terminals $Q_0$ to $Q_n$ connected to the outputs of the amplifiers $AM_0$ to $AM_n$.

Furthermore, the semiconductor integrated circuit device 6 is provided with a first power supply terminal 10 connected to an anode of the rectifying diode D1; a lead terminal 11 connected to a cathode of the rectifying diode D2; another lead terminal 12 connected to both a cathode of the rectifying diode D1 and an anode of the rectifying diode D2; another lead terminal 13 connected to the output of the drive unit 9; an adjusting terminal 14 for adjusting operation of the triangular wave generating circuit 7; and a second power supply terminal 15 for applying operating power supply voltages to the amplifiers $AM_0$ to $AM_n$.

Now, a use example of the semiconductor integrated circuit device 6 will be explained with reference to FIG. 1 and FIG. 2.

In FIG. 1, a power supply 16 is connected between the first power supply terminal 10 and the ground terminal $P_{G1}$. The power supply 16 outputs a relatively low voltage Vcc and corresponds to a dry cell, an on-vehicle battery, and the like. A capacitor $C_{D1}$ is connected between the lead terminals 12 and 13, and a capacitor $C_{D2}$ is connected between the lead terminal 11 and the ground terminal $P_{G1}$. Furthermore, the lead terminal 11 is connected to the second power supply terminal 15, and an adjusting resistor "$r_1$" is connected between the adjusting terminal 14 and the ground terminal $P_{G2}$. External audio signal sources $SG_0$ to $SG_n$ are connected to the input terminals $IN_0$ to $IN_n$, and loads $R_0$ to $R_n$ such as power amplifier circuits for driving external speakers are connected to the output terminals $Q_0$ to $Q_n$.

Figure 2:
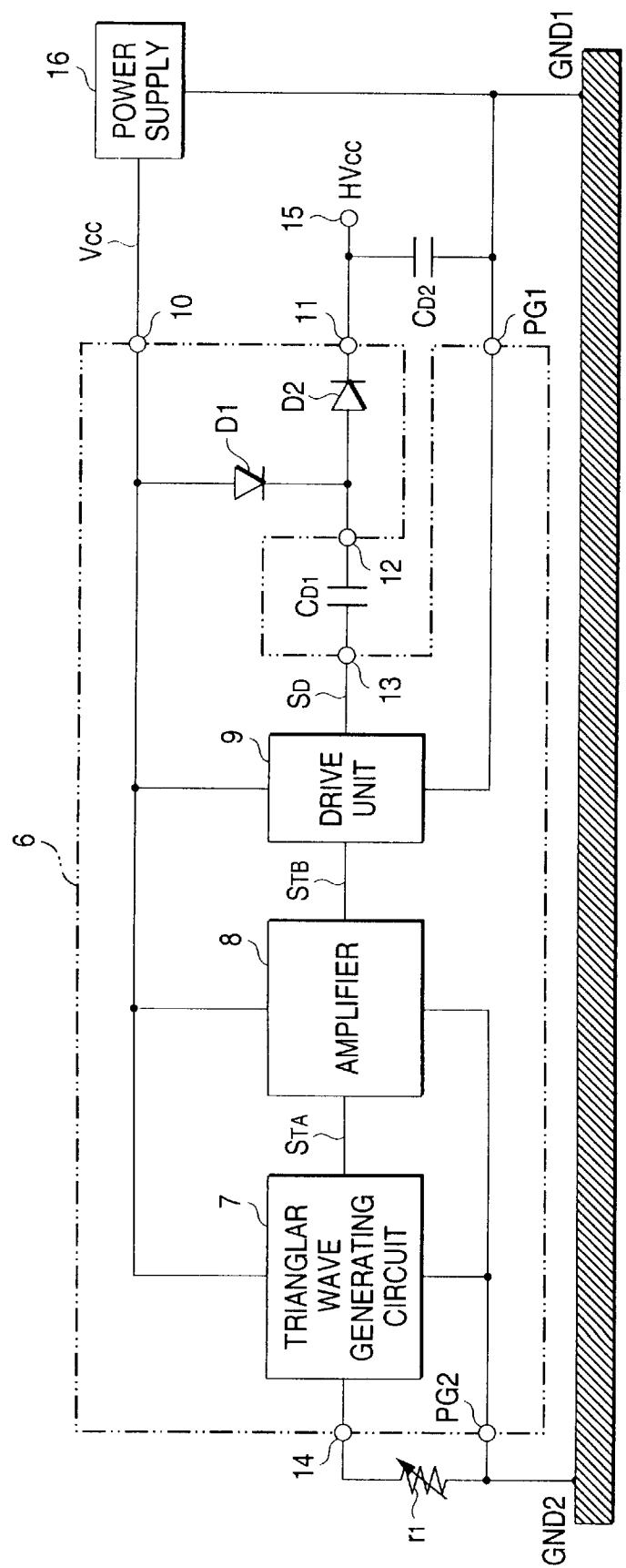
FIG. 2 is an explanatory diagram for showing a wiring method for forming a wiring line of the step-up power supply circuit on an electronic circuit board.

Also, as shown in FIG. 2, in the case that this semiconductor integrated circuit device 6 and the external elements such as the capacitors $C_{D1}$ and $C_{D2}$ are mounted to be wired on an electric circuit board, ground wiring patterns GND1 and GND2 which may not give adverse electric influences to each other are formed on an electric circuit board 17. Then, the drive unit 9, the capacitor $C_{D1}$, and the ground terminal $P_{G1}$ of the power supply 16 are connected to one ground wiring pattern GND1, whereas the triangular wave generating circuit 7, and the ground terminal $P_{G2}$ of the amplifiers 8 and $AM_0$ to $AM_n$ are connected to the other ground wiring pattern GND2.

Next, arrangements of the triangular wave generating circuit 7, the amplifier 8, and the drive unit 9 will now be described with reference to FIG. 3 to FIG. 5.

Figure 3:
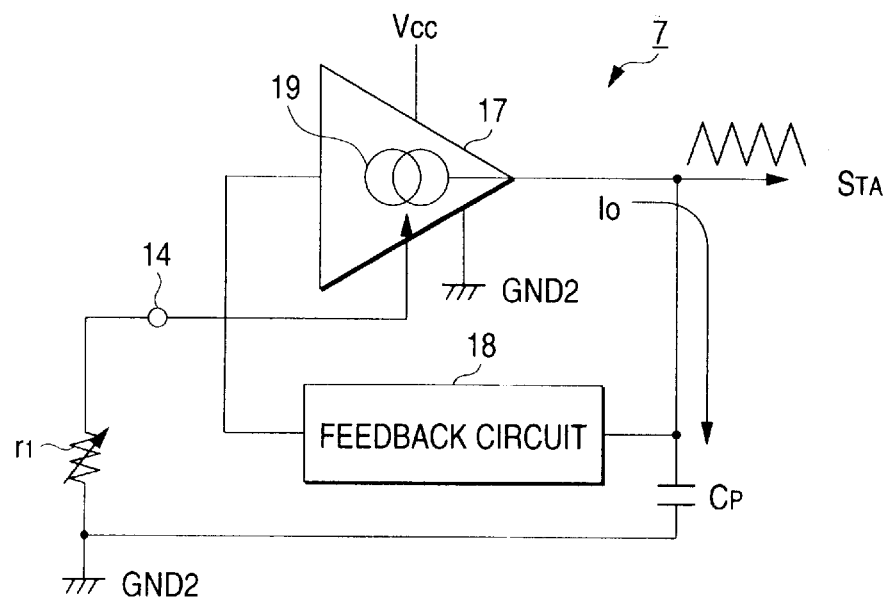
FIG. 3 is a circuit diagram for schematically indicating an arrangement of a triangular wave generating circuit.

In FIG. 3, the triangular wave generating circuit 7 is arranged by employing a normal phase amplifier 17 having a constant current source 19, a feedback circuit for feeding back an output of the normal phase amplifier 17 to an input of this feedback circuit 18 in a positive manner, and a capacitor Cp. In response to a signal (not shown) having a predetermined time period and produced by an internal oscillation, the normal phase amplifier 17 supplies/sinks a constant current $I_0$ from the constant current source 19 to the capacitor Cp, and then supplies a signal having a triangular wave (will be simply referred to as a "triangular wave" hereinafter) "$S_{TA}$" which is produced across the capacitor Cp by supplying/sinking the constat current $I_0$, to the amplifier 8. Also, when the resistor $r_1$ is connected to the adjusting terminal 14, the value of the constat current $I_0$ of the constant current source 19 is adjusted based upon the resistance value of the resistor $r_1$, so that the time period of the triangular wave $S_{TA}$ can be properly adjusted.

Figure 4:
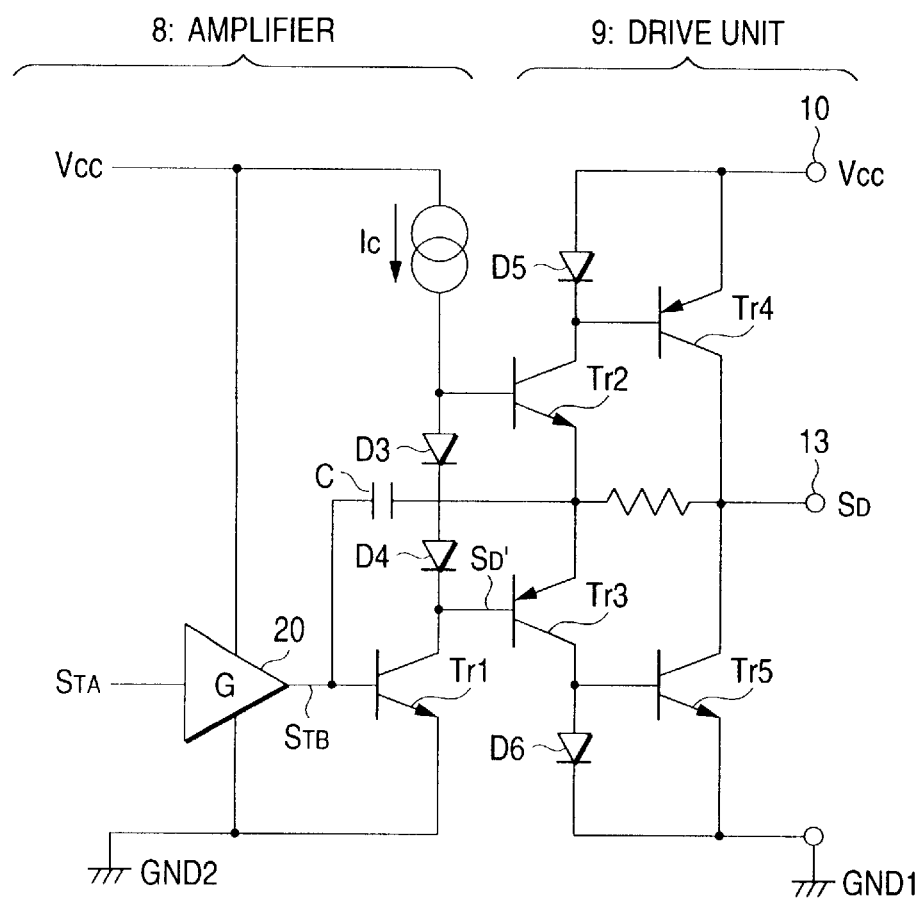
FIG. 4 is a circuit diagram for showing an arrangement of an amplifier and an arrangement of a drive unit.
Figure 5:
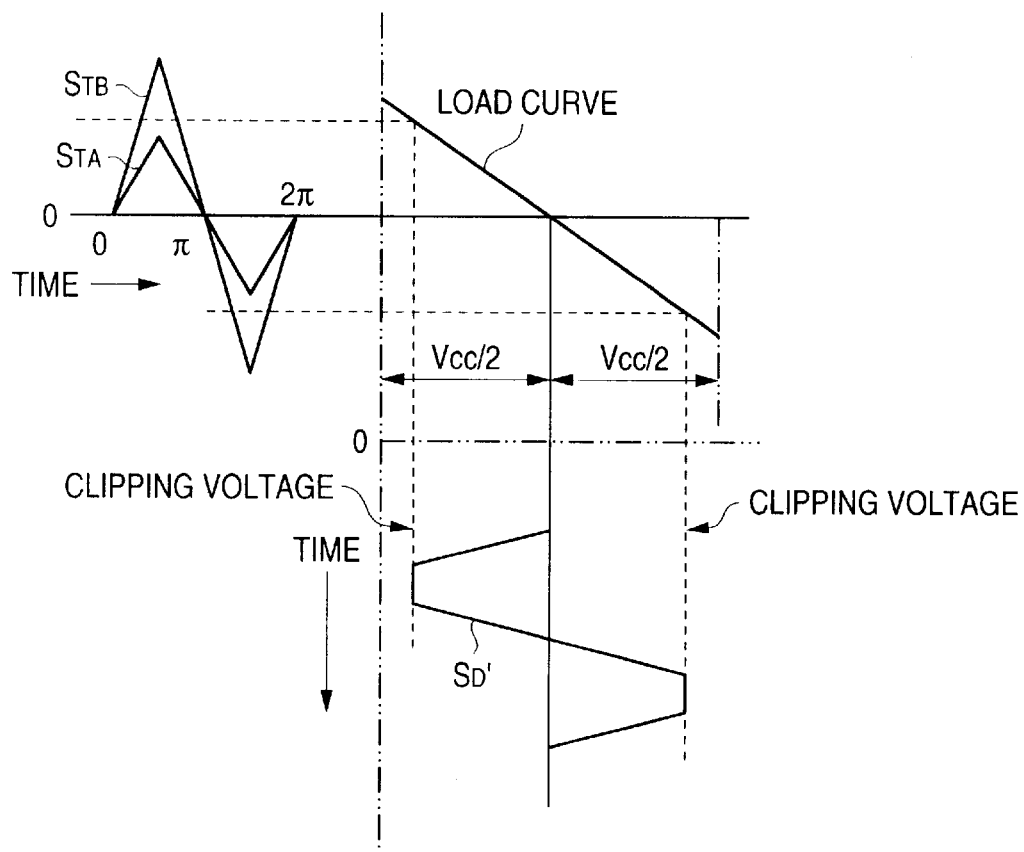
FIG. 5 is an explanatory diagram for indicating a maximum output condition for explaining a basic idea for producing a trapezoidal wave.

In FIG. 4, the amplifier 8 is constituted by employing a voltage amplifier 20 for amplifying the triangular wave $S_{TA}$, a transistor Tr1 into which the triangular wave $S_{TB}$ amplified in the voltage amplifier 20 is inputted, bias diodes D3, D4, a constant current source Ic and a capacitor C connected between the output of the amplifier 20 and the load terminal 13. The drive unit 9 corresponds to a power amplifier circuit arranged by transistors Tr2 to Tr5, and the like.

In this case, the voltage amplifier 20 amplifies the triangle wave $S_{TA}$ so as to output another triangle wave $S_{TB}$ having a large amplitude. This triangle wave $S_{TB}$ having such a large amplitude may drive a transistor Tr1 to a saturation region. As a result, as indicated in a maximum output condition of FIG. 5, a trapezoidal wave signal (will be simply referred to as a "trapezoidal wave" hereinafter) $S_D'$ is produced from the collector of the transistor Tr1, and this trapezoidal wave is clipped at a saturation voltage (namely, clipping voltage shown in this drawing). This trapezoidal wave $S_D'$ is power-amplified by the drive unit 9, and then the drive unit 9 outputs a power-amplified trapezoidal wave $S_D$ to the lead terminal 13.

Next, a description will now be made of operations of the semiconductor integrated circuit device 6 equipped with the above-explained arrangement based upon a waveform diagram shown in FIG. 6, and also the use examples indicated in FIG. 1 and FIG. 2.

Figure 6:
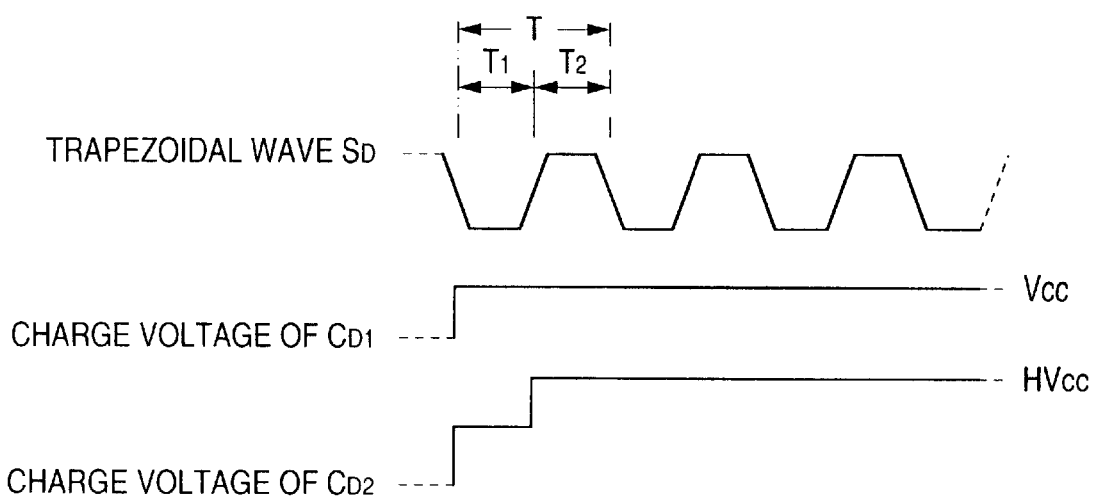
FIG. 6 is a waveform diagram for explaining operation of the step-up power supply circuit.

In FIG. 6, when the trapezoidal wave $S_D$ having a predetermined time period T is supplied to the capacitor $C_{D1}$ and this trapezoidal wave $S_D$ is produced by the triangular wave generating circuit 7, the amplifier 8, and the drive unit 9, the rectifying diode D1 is biased in the forward bias manner to be brought into an ON state, whereas the rectifying diode D2 is biased in the reverse bias manner to be brought into an OFF state in a time period T1 during which the trapezoidal wave $S_D$ becomes a low-leveled clamping voltage. As a result, a current flowing from the power supply 16 via the rectifying diode D1 is charged into the capacitor $C_{D1}$, so that a charge voltage substantially equal to the voltage Vcc of the power supply 16 is produced across the capacitor $C_{D1}$.

In a time period T2 during which the trapezoidal wave $S_D$ becomes a high-leveled clamping voltage, the rectifying diode D1 is brought into an OFF state and the rectifying diode D2 is brought into an ON state. As a result, an added voltage is applied via the rectifying diode D2 to the capacitor $C_{D2}$, so that a step-up voltage HVcc (nearly equal to 2×Vcc) substantially two times higher than the voltage Vcc is produced across the capacitor $C_{D2}$. This added voltage is obtained by adding the high-leveled clamping voltage to the above-explained charge voltage which is charged into the capacitor $C_{D1}$ in the time period T1.

Then, when the voltage of the trapezoidal wave $S_D$ is continuously charged in a predetermined time period T, the charge voltage across the capacitor $C_{D1}$ is maintained at a voltage substantially equal to the voltage Vcc, and also the charge voltage across the capacitor $C_{D2}$ is maintained at the step-up voltage HVcc.

The step-up voltage HVcc produced in this manner is applied to the second power supply terminal 15, and while this step-up voltage HVcc is used as the operating power supply voltage, the amplifiers $AM_0$ to $AM_n$ are operated. As a result, since the amplifiers $AM_0$ to $AM_n$ amplify the audio signals supplied from the signal sources $SG_0$ to $SG_n$ over a high dynamic range, it is possible to realize a high power audio appliance and the like.

Furthermore, since the rectifying diodes D1 and D2 are turned ON/OFF in response to the trapezoidal wave $S_D$ having the smaller RF component than that of the rectangular wave, the RF switching noise is not produced from the rectifying diodes D1 and D2. As a consequence, the conventional problem, namely the switching noise mixture into the amplifiers $AM_0$ to $AM_n$ can be suppressed, so that the audio appliance having the high grade can be realized.

Also, as previously explained, the RF switching noise caused by the rectifying diodes D1 and D2 can be suppressed, as represented in FIG. 1, it is possible to realize such a semiconductor integrated circuit device 6 that both the amplifiers $AM_0$ to $AM_n$ which are easily adversely influenced by the noise, and the rectifying diodes D1 and D2 which constitute the step-up circuit are formed on the same semiconductor substrate.

Also, since the step-up power supply circuit capable of suppressing the occurrence of noise is built in the semiconductor integrated circuit device 6, when this semiconductor integrated circuit device 6 is used, a total number of electronic components can be reduced. In particular, it is possible to largely reduce a total number of externally provided electronic components such as the capacitors, resistors, or coils used to absorb the noise.

It should be understood in this embodiment mode that the rectifying diodes D1 and D2 are turned ON/OFF by using the trapezoidal wave $S_D$. That is, the inclination of the rising amplitude is substantially equal to that of the falling amplitude in this trapezoidal wave $S_D$. Alternatively, another trapezoidal wave, the rising inclination of which is different from the falling inclination thereof, may be employed.

Figure 7A:
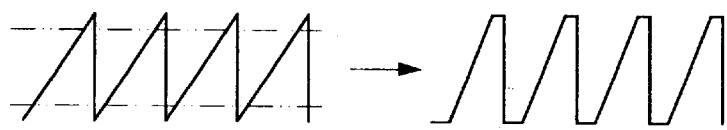
FIGS. 7A and 7B are waveform diagrams for representing other waveform examples used to drive the step-up power supply circuit.
Figure 7B:
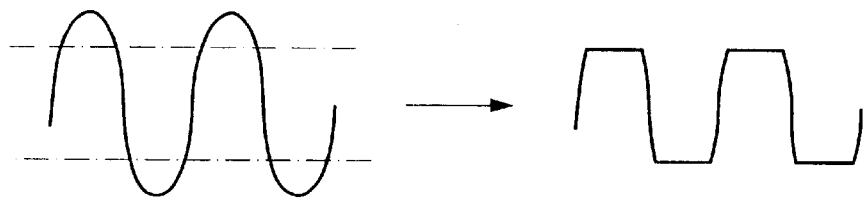
Figure 8:
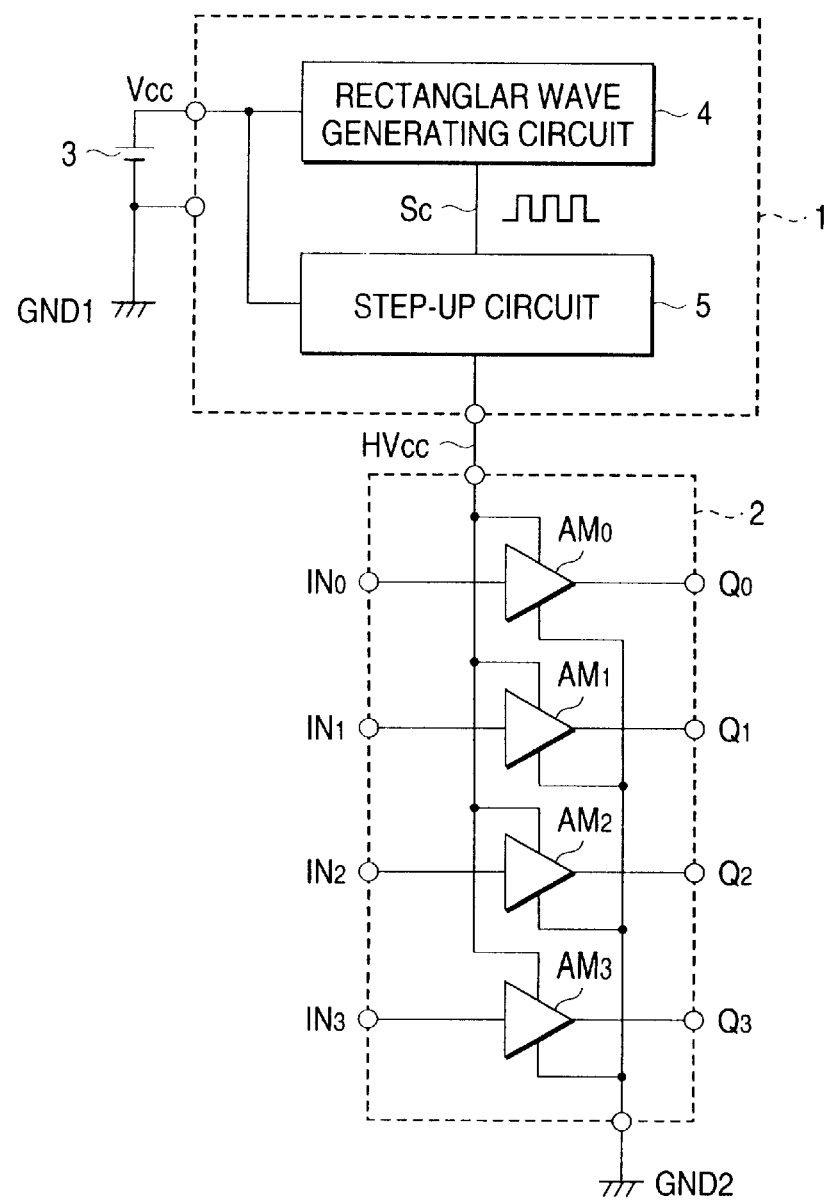
FIG. 8 is a block diagram for showing the arrangement of the electronic appliance equipped with the conventional step-up power supply circuit.

In the above explanation, since the triangular wave $S_{TB}$ is clipped, the trapezoidal wave $S_D$ is produced. Alternatively, as shown in FIG. 7A, the trapezoidal wave $S_D$ may be produced by clipping a sawtooth wave. In this alternative case, since the triangular wave generating circuit 7 shown in FIG. 1 is replaced by a sawtooth wave generating circuit, the above-explained alternative trapezoidal wave may be realized. Also, the rectifying diodes D1 and D2 may be turned ON/OFF in such a manner that the triangular wave generating circuit 7 shown in FIG. 1 is replaced by a sine wave generating circuit, and the sine wave generated from this sine wave generating circuit is clipped at a level shown in FIG. 7B to obtain a signal, and then this signal is supplied to these rectifying diodes D1 and D2.

In other words, the rectifying diodes D1 and D2 may be turned ON/OFF by using a signal having a properly selected waveform as defined in the following restriction: While a waveform whose amplitude is not rapidly changed such as a rectangular wave is used, an amplitude level of this waveform is maintained every predetermined time period, like a trapezoidal wave employed in this embodiment mode.

As previously described, in accordance with the step-up power supply circuit of the present invention, while the rectifying elements and the capacitive elements are employed, these rectifying elements are turned ON/OFF in response to such a signal having the waveform whose amplitude becomes constant every time a preselected time period has passed, but having no rapidly changed amplitude, so that the step-up voltage is produced across the capacitive element. As a consequence, it is possible to suppress the conventional problem, namely the occurrence of the switching noise from the rectifying elements.

Also, in accordance with the integrated circuit device equipped with the step-up power supply circuit of the present invention, while the rectifying elements and the capacitive elements are employed, these rectifying elements are turned ON/OFF in response to such a signal having the waveform whose amplitude becomes constant every time a preselected time period has passed, but having no rapidly changed amplitude, so that the step-up voltage is produced across the capacitive element. As a consequence, it is possible to suppress the conventional problem, namely the occurrence of the switching noise from the rectifying elements. As a result, in the integrated circuit device of the present invention, even when both the step-up power supply circuit and a circuit (another circuit) operable by using the step-up voltage produced from this step-up voltage circuit as an operating power supply voltage are formed on the same semiconductor substrate, another circuit can be operated without being adversely influenced by the noise. Also, since the step-up power supply circuit can be built in the integrated circuit device, when this integrated circuit device is used in an electronic appliance, a total number of electronic components can be reduced.

What is claimed is:

1. A step-up power supply circuit comprising:
   a first rectifying element to which a predetermined voltage is applied from a power supply;
   a first capacitive element connected in series with said first rectifying element;
   a second rectifying element connected to a joint point between said first rectifying element and said first capacitive element;
   a second capacitive element connected in series with said second rectifying element; and
   drive means connected in series with said first capacitive element, for applying to said first capacitive element, a signal having a waveform whose amplitude is not rapidly changed, but becomes constant every predetermined time period; wherein:
   a step-up voltage higher than said predetermined voltage is produced from said second capacitive element by turning ON/OFF said first and second rectifying elements in response to a change in the amplitudes of said signal.

2. A step-up power supply circuit as claimed in claim 1 wherein said signal is a trapezoidal waveform signal.

3. An integrated circuit device equipped with a step-up power supply circuit, in which the step-up power supply circuit and a circuit operated by using a step-up voltage produced from said step-up power supply circuit as an operating power supply voltage are formed on the same semiconductor substrate, said step-up power supply circuit comprising:
   a first rectifying element to which a predetermined voltage is applied from a power supply and a first capacitive element is series-connected;
   a second rectifying element which is connected to a joint point between said first rectifying element and said first capacitive element, and to which a second capacitive element is series-connected; and
   drive means connected in series with said first capacitive element, for applying to said first capacitive element, a signal having a waveform whose amplitude is not rapidly changed, but becomes constant every predetermined time period; and wherein: a step-up voltage higher than said predetermined voltage is produced from said second capacitive element by turning ON/OFF said first and second rectifying elements in response to a change in the amplitudes of said signal.

4. An integrated circuit device equipped with a step-up power supply circuit as claimed in claim 3 wherein said signal is a trapezoidal waveform signal.

5. A power supply circuit, comprising:
   a first rectifying element that receives a predetermined power supply voltage;
   a first capacitive element connected in series with said first rectifying element;
   a second rectifying element connected to a first node, wherein said first node is located between said first rectifying element and said first capacitive element;
   a second capacitive element connected in series with said second rectifying element; and
   a waveform generating circuit connected to said first capacitive element,
   wherein said waveform generating circuit generates a waveform signal and supplies said waveform signal to said first capacitive element,
   wherein said waveform signal oscillates such that an amplitude of said waveform signal does not rapidly change between oscillations and wherein said amplitude is constant for a predetermined time during a period of said waveform signal,
   wherein a step-up voltage is generated from said second capacitive element by selectively turning said first rectifying element and said second rectifying element on and off in response to a change in said amplitude of said waveform signal.

6. The circuit as claimed in claim 5, wherein said second capacitive element is connected to ground.

7. The circuit as claimed in claim 5, wherein said waveform generating circuit comprises:
   a wave generating circuit that outputs an oscillating signal having an amplitude less than a clipping voltage;
   an amplifier that amplifies said oscillating signal to at least indirectly generate said waveform signal, wherein said amplitude of said waveform signal is clipped at said clipping voltage.

8. The circuit as claimed in claim 7, wherein said waveform signal is a trapezoidal signal.

9. The circuit as claimed in claim 8, wherein said oscillating signal is a triangular wave signal.

10. The circuit as claimed in claim 7, wherein said oscillating signal is a triangular wave signal.

11. The circuit as claimed in claim 7, wherein said oscillating signal is a sine wave signal.

12. The circuit as claimed in claim 7, wherein said oscillating signal is a saw tooth wave signal.

* * * * *